April 24, 1962 S. D. EAGLETON ET AL 3,030,665
REFINING THERMOPLASTIC RESINS
Filed Feb. 25, 1959
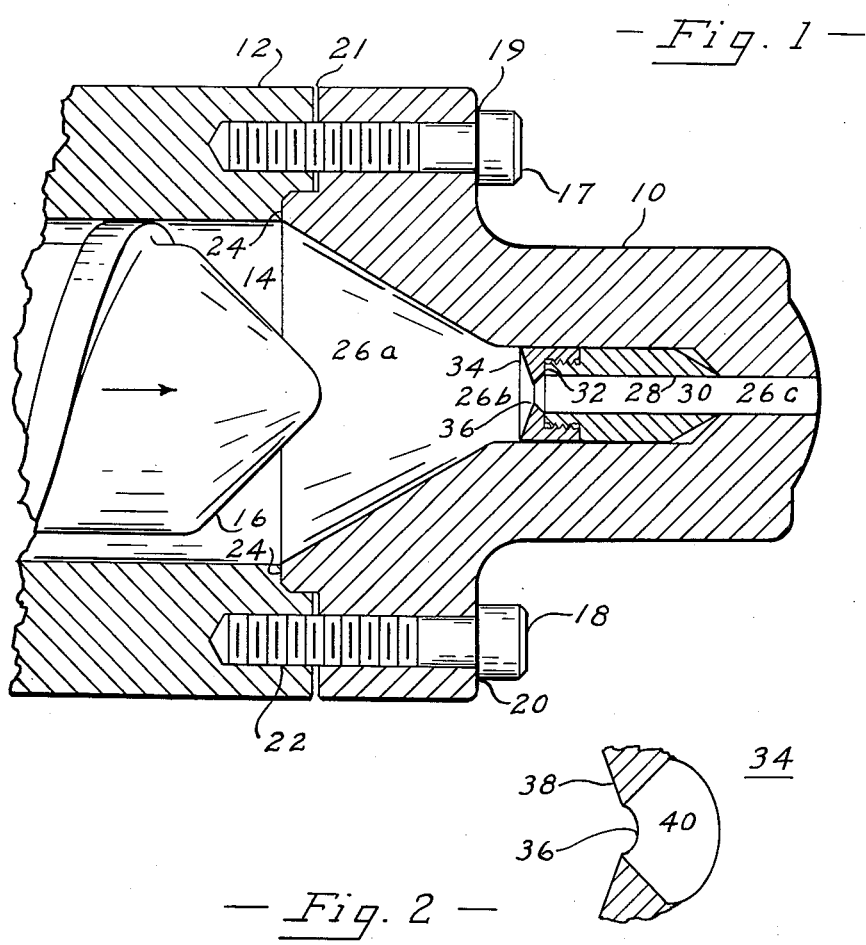
SIDNEY DOUGLAS EAGLETON
STANLEY JOHN SKINNER
INVENTORS
BY Cornelius H. Cleary
ATTORNEY

United States Patent Office 3,030,665
Patented Apr. 24, 1962

3,030,665
REFINING THERMOPLASTIC RESINS
Sidney Douglas Eagleton and Stanley John Skinner,
Newport, England
Filed Feb. 25, 1959, Ser. No. 795,529
Claims priority, application Great Britain Mar. 5, 1958
3 Claims. (Cl. 18—48)

The present invention relates to refining gel-containing thermoplastic resins or to express it differently, a method for effectively breaking down undesirable gel formation contained in thermoplastic resins.

In providing shaped articles from thermoplastic resins, the resin which is in a softened condition, is provided with the desired shape by molding, casting or the like. Upon being allowed to cool, the shape is retained. Of particular importance in operations of this type, is the appearance of the finished article, more particularly, the surface should be smooth, free of "fish eyes" and other defects. This will depend for a large part upon the particular thermoplastic resin employed, and with many resins excellent results are obtained without taking any special precautions.

With certain thermoplastic resins such as butadiene-styrene resins, a smooth surface can be obtained while the resin is hot, however, upon becoming cooled the surface becomes uneven. It has been determined that this effect can, at least in part, be attributed to the fact that the thermoplastic resin is heterogeneous in nature, in that it contains particles of gel, the latter manifesting characteristics different from that of the bulk of the resin. Moreover, it has been determined that when resins containing gel particles or formations are formed into thin sheets as by blow extrusion, the gel shows up in the sheets in the form of "fish eyes." To combat this, thermoplastic resins such as these are refined to homogenize or effectively reduce the content of undesirable gel particles. Commonly, the resins are subjected to conventional physical mixing. To do so effectively however, long periods of mixing are necessary. In addition to serious financial complications which arise from using extended mixing periods, the practice is often accompanied by deterioration of the resin.

Accordingly, it is a principal object of the present invention to provide a simplified method by which to refine gel-containing thermoplastic resins.

Another object is to provide apparatus on which to practice this refining method.

Other objects will in part be obvious and will in part appear hereinafter.

These and other objects of the invention can be attained in a refining method which comprises directing thermoplastic material in fluid form through a knife-edged circular orifice, the knife-edge being formed by opposing frustrum recessed faces, said faces being disposed in relation to one another at an angle of less than about 90°.

For a fuller understanding of the nature and objects of the invention, reference should be made to the following detailed description taken in connection with the accompanying drawings in which:

FIG. 1 is a side view, in section and with parts broken, of an extruder barrel having attached a refining head, which is an embodiment of the present invention.

FIG. 2 is a magnified fragmentary perspective side view, in section and with parts broken, showing the crown portion of a knife-edged orifice corresponding to that shown in FIG. 1.

Referring to FIG. 1, an open-bored refining head 10 is shown provided at the discharge end of extruder barrel 12, the latter having an extrusion bore 14 and an extrusion screw 16 located therein. Refining head 10 is attached in axial alignment to barrel 12 by use of threaded bolts 17 and 18 which are tapped through slots 19 and 20 located at the outer periphery of refining head 10, and threaded into complementary threaded slots 21 and 22 tapped into the face of extruder barrel 12. An annular projection 24 is provided on the afterend of head 10, to facilitate centering of head 10, with respect to the axis of extruder bore 14. The outer periphery of annluar projection 24 is machined to provide close slidable contact between the same and the periphery of bore 14.

Bore 14 is in effect extended through refining head 10 by means of a circular passage generally referred to as 26 and further designated in accordance with its location 26a, 26b, and 26c. More specifically passage 26, constitutes an introductory section 26a, immediate to bore 14, which is shown constricting in the direction of extension to become intermediate throat section 26b and on further constriction eventuates as passage section 26c.

Intermediate throat section 26b of passage 26 serves to seat an annular sleeve 28 which is provided with a circular orifice 30 having the same diameter as section 26c of passage 26. The afterpart of sleeve 28 is provided with an annular externally threaded projection 32, which serves to threadably attach and locate annular ring 34, the latter having a centered, continuously knife-edged circular orifice 36. The interior or crown portion of ring 34, shown magnified in FIG. 2, projects inwardly sufficiently to cause orifice 36 to have a smaller diameter than that of orifice 30. Frustrum recessed faces 38 and 40 of the crown portion of ring 34, which frame knife-edged circular orifice 36, are disposed in relationship to one another as to provide an angle of less than about 90° therebetween.

The angle described between the faces 38 and 40 is preferably between 30° and 80°, and more preferably between 50° and 70°, with the optimum angle being 60°–65°. Circular orifice 36 is preferably one of small diameter, having a diameter of 0.04 inch or less. Excellent results are obtainable using an orifice diameter between 0.01 and 0.03 inch, with the optimum being 0.02 inch. Preferably the circular orifice 36 is positioned a short distance before the final extrusion point.

In operation, rotation of screw 16 causes thermoplastic material, in a fluid state, to be forced out of bore 14 and immediately into passage 26. The material advances through passage 26, first through introductory section 26a and then through intermediate throat section 26b which directs it through knife-edged orifice 36 and finally is discharged from passage section 26c.

The process of the invention can be practiced in conjunction with any apparatus capable of directing or forcing thermoplastic resins in fluid form to be directed through circular orifice 36. An injection molding machine or an extruder are examples of such apparatus.

The process can be used to refine thermoplastic resins which are in a fluid or liquid state, generally the result of heating the same, or it can be used on polymers contained in various liquid media. Typical resins which contain undesirably large particles of gel, are toughened polystyrenes, for instance polystyrene containing blended or copolymerized natural or synthetic rubber. Other thermoplastic resins on which the invention can be practiced to good effect include homopolymers and copolymers of polyethylene, nylon and polyvinyl chloride and the like containing a gel fraction incompatible with the bulk of the material.

The temperature at which the proceess should be carried out is dependent on the thermoplastic resin to be refined; thus high molecular weight resins require higher temperatures to soften sufficiently as compared with lower molecular weight resins which generally require lower temperatures to do so. Usually the normal temperature used for molding or extruding these resins will be found to be satisfactory.

While in general the invention is most expeditously used in refining thermoplastic resins which benefit by such a treatment, it can also be used to improve the dispersion of various components such as pigments, fillers and modifying agents, in thermoplastic materials.

The effectiveness for a given process in refining resins containing gel can be found by measuring the "refining factor." This is the ratio of the percentage of gel present in a given thermoplastic resin before refining to the percentage of gel remaining after refining. The quantity of gel is measured (before and after the refining process) by placing a resin sample of known weight into a basket made of stainless steel gauze of 200 mesh which is located in a Soxhlet extractor. The resin sample is extracted with boiling benzene for 6 hours; the percentages of gel and therefore the refining factor are calculated from the differences in weight before and after extraction. A refining factor of about 3 shows that a considerable improvement has been achieved.

The following examples are provided in illustration of the various aspects of the invention.

EXAMPLE I

Part A

A sample is taken from a batch of toughened polystyrene-butadiene synthetic rubber and subjected to the above-identified test procedure. The polystyrene is found to contain 0.22% by weight of gel.

Part B

A portion of the batch is refined by passing it in a fluid state through a 0.015 inch diameter knife-edged orifice made from stainless steel and fitted to a 1 oz. Hupfield injection molding machine. The orifice is located at a point just before the final nozzle leading to the mold. The faces of the orifice are inclined together at an angle of 65°. Test specimens are prepared from the resin by molding at a cylinder temperature of 200° C. and a mold temperature of 60° C. The molding cycle used is as follows:

(a) 45 seconds: Plunger forward and mold closed.
(b) 40 seconds: Plunger back and mold closed.
(c) 5 seconds: Plunger back and mold open.

Part C

Test specimens are also taken from a portion of the batch which is passed through the injection molding machine fitted with a normal injection molding orifice having a diameter of 0.156 inch and a length of 0.625.

The test specimens from both Part B and Part C are subjected to the test procedure set forth above. The refining factor calculated for each type of orifice is as follows:

TABLE I

| Type of orifice: | Refining factor |
| --- | --- |
| B. Knife-edged orifice | 3.3 |
| C. Normal injection molding orifice | 1.3 |

The test results reflect that the product obtained by refining with the knife-edged orifice has a considerably higher refining factor than that obtained from using the ordinary type of orifice.

EXAMPLE II

Part A

A crude polyethylene in fluid form is refined using the sharp-edged orifice and injection molding machine of Example I. Test specimens are prepared from the polyethylene using a cylinder temperature of 156° C.

The molding cycle used is as follows:

(a) 30 seconds: Plunger forward and mold closed.
(b) 25 seconds: Plunger back and mold closed.
(c) 5 seconds: Plunger back and mold open.

The refined material is then made into film.

Part B

A similar experiment is carried out on another portion of the polyethylene substituting a knife-edged orifice having a diameter of 0.0225 inch for the one used in Part A.

Part C

A third portion of the polyethylene is cast into a sheet having the same thickness as the sheets made from the refined products. The clarity of the polyethylene sheets is estimated by means of an apparatus which measures the amount of light dispersed when a narrow beam of light is passed through each sheet, the results are recorded in terms of an arbitrary scale on which increased clarity gives a lower result.

The results are shown below:

TABLE II

| | Clarity |
| --- | --- |
| A. Refined using orifice of diameter 0.0225 inch | 458 |
| B. Refined using orifice of diameter 0.015 inch | 409 |
| C. Unrefined polyethylene | 880 |

From these results it is clear that the refining treatment lends improved clarity to the materials so treated.

It will thus be seen that the objects set forth above, among those made apparent from the preceding description, are efficiently attained and, since certain changes may be made in carrying out the above process and in the apparatus on which it is practiced without departing from the scope of the invention, it is intended that all matter contained in the above description shall be interpreted as illustrative and not in a limiting sense.

What is claimed is:

1. A method for refining gel-containing thermoplastic materials which comprises directing said thermoplastic material while in fluid form through a knife-edged circular orifice having a diameter of less than 0.04 inch, the knife edge of which is formed by opposing frustum recessed faces, said faces being disposed in relation to one another at an angle of less than about 90°.

2. The method according to claim 1 wherein the angle between said faces is 60°–65°.

3. The method according to claim 1 wherein the diameter of the knife-edged orifice is 0.02 inch.

References Cited in the file of this patent

UNITED STATES PATENTS

| 2,077,373 | Formhals | Apr. 13, 1937 |
| 2,364,552 | Reichel | Dec. 5, 1944 |
| 2,750,034 | Gersman | June 12, 1956 |
| 2,804,651 | Peterson | Sept. 3, 1957 |
| 2,935,502 | Reding | May 3, 1960 |